(12) United States Patent
Delbecq et al.

(10) Patent No.: US 9,835,715 B2
(45) Date of Patent: Dec. 5, 2017

(54) INTEGRATED CIRCUIT, RADAR DEVICE AND METHOD OF CALIBRATING A RECEIVER

(71) Applicants: Dominique Delbecq, Fonsorbes (FR); Olivier Doare, La Salvetat St Gilles (FR); Gilles Montoriol, Plaisance du Touch (FR)

(72) Inventors: Dominique Delbecq, Fonsorbes (FR); Olivier Doare, La Salvetat St Gilles (FR); Gilles Montoriol, Plaisance du Touch (FR)

(73) Assignee: NXP USA, Inc., Austin, TX (US)

(\*) Notice: Subject to any disclaimer, the term of this patent is extended or adjusted under 35 U.S.C. 154(b) by 374 days.

(21) Appl. No.: 14/660,471

(22) Filed: Mar. 17, 2015

(65) Prior Publication Data
US 2016/0109559 A1  Apr. 21, 2016

(51) Int. Cl.
*G01S 7/40* (2006.01)
*G01S 13/34* (2006.01)
*G01S 13/93* (2006.01)

(52) U.S. Cl.
CPC ............ *G01S 7/4056* (2013.01); *G01S 13/34* (2013.01); *G01S 13/931* (2013.01); *G01S 2007/4073* (2013.01)

(58) Field of Classification Search
CPC ...... G01S 7/4056; G01S 13/34; G01S 13/931; G01S 2007/4073
See application file for complete search history.

(56) References Cited

U.S. PATENT DOCUMENTS

| 5,495,202 A | * | 2/1996 | Hsu ................... | H03B 21/04 327/113 |
| 7,859,459 B2 | * | 12/2010 | McCune, Jr. ......... | H01Q 3/267 342/372 |
| 2008/0074311 A1 | * | 3/2008 | Atherton ............... | G01S 7/282 342/202 |

(Continued)

FOREIGN PATENT DOCUMENTS

WO   WO 2015044703 A1 *  4/2015 ............... H03H 7/12

OTHER PUBLICATIONS

Tian Tong and Wu Shunjun, "The analytic model for noise of direct digital frequency synthesizer," 2001 CIE International Conference on Radar Proceedings (Cat No. 01TH8559), Beijing, 2001, pp. 916-919.*

(Continued)

*Primary Examiner* — John B Sotomayor
(74) *Attorney, Agent, or Firm* — Charlene R. Jacobsen

(57) ABSTRACT

An integrated circuit for a radar device comprises at least one transmitter and at least one receiver. The integrated circuit comprises: a direct digital synthesizer, DDS, configured to output a control signal; and a multiplier configured to receive a local oscillator input signal and a further input signal from the DDS. In a first mode of operation, the DDS and multiplier cooperate to generate at least one transmitter signal to be transmitted from the radar device; and in a second mode of operation the DDS and multiplier cooperate to generate at least one low frequency modulated transmitter signal to be internally routed to the at least one receiver for calibrating the at least one receiver.

19 Claims, 5 Drawing Sheets

(56) References Cited

U.S. PATENT DOCUMENTS

| | | | | |
|---|---|---|---|---|
| 2015/0219753 A1* | 8/2015 | Salle | ............ | G01S 7/4008 342/174 |
| 2016/0103206 A1* | 4/2016 | Pavao-Moreira | ....... | G01S 13/08 342/104 |
| 2016/0109559 A1* | 4/2016 | Delbecq | ............ | G01S 13/34 342/170 |
| 2016/0146931 A1* | 5/2016 | Rao | ............ | H01Q 1/3233 342/59 |
| 2016/0218406 A1* | 7/2016 | Sanford | ............ | H01P 1/208 |

OTHER PUBLICATIONS

N. Caglio, J. L. Degouy, D. Meignant, P. Rousseau and B. Leroux, "An integrated GaAs 1.25 GHz clock frequency FM-CW direct digital synthesizer," 15th Annual GaAs IC Symposium, San Jose, CA, USA, 1993, pp. 167-170.*

Bon-Hyun Ku, 75-85 GHz flip-chip phased array RFIC with simultaneous 8-transmit and 8-receive paths for automotive radar applications. Radio Frequency Integrated Circuits Symposium (RFIC), 2013 IEEE. Jun. 2-4, 2013, pp. 371-374.

* cited by examiner

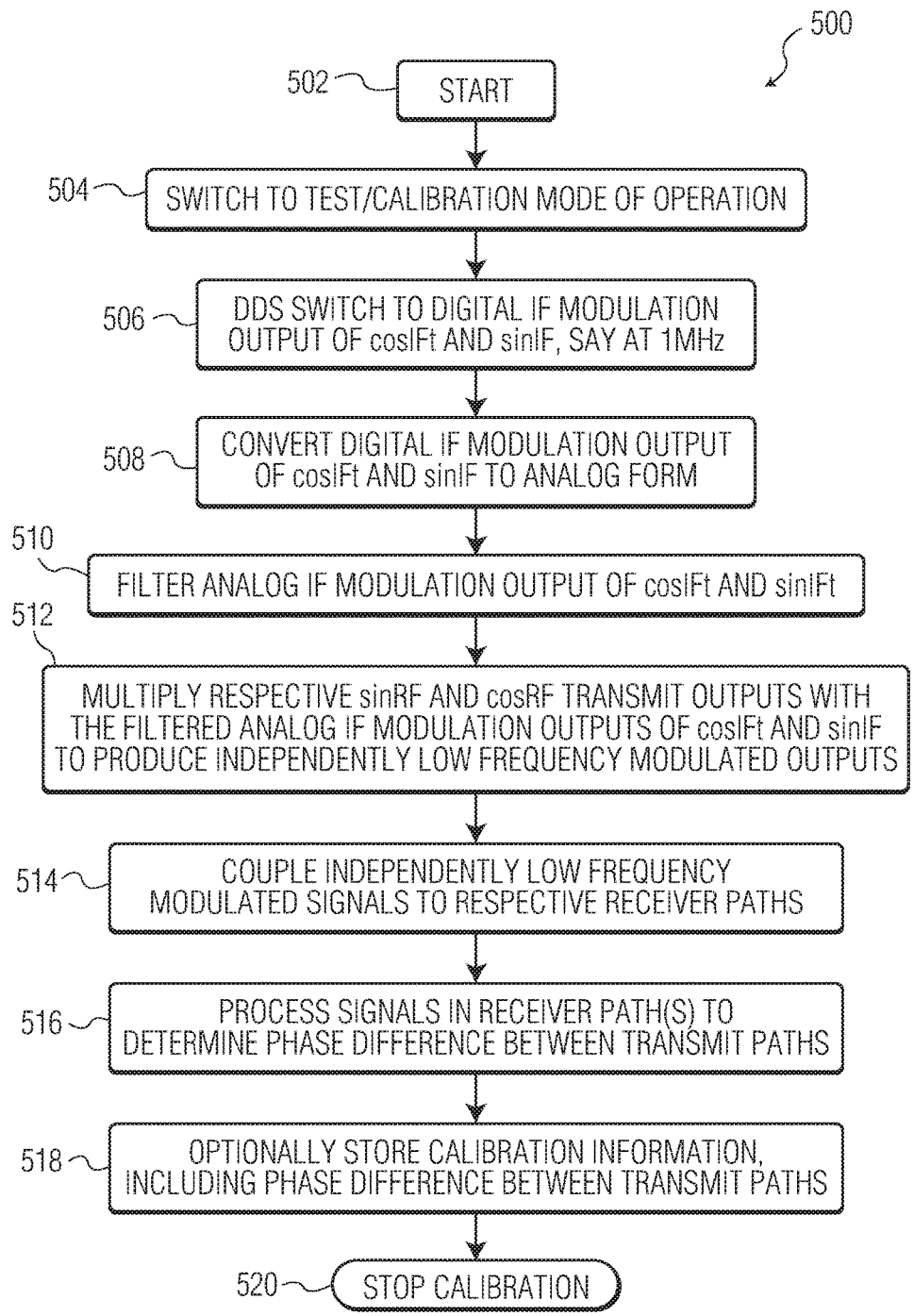

INTEGRATED CIRCUIT, RADAR DEVICE AND METHOD OF CALIBRATING A RECEIVER

CROSS REFERENCE TO RELATED APPLICATION(S)

The present application claims priority to International Patent Application No. PCT/IB2014/002474, entitled "INTEGRATED CIRCUIT, RADAR DEVICE AND METHOD OF CALIBRATING A RECEIVER," filed on Oct. 17, 2014, the entirety of which is herein incorporated by reference.

FIELD OF THE INVENTION

The field of this invention relates to an integrated circuit, a radar device and a method of calibrating at least one receiver. The field of this invention is applicable to, but not limited to, a radar device and a mechanism to internally generate at least one test signal to calibrate at least one receiver.

BACKGROUND OF THE INVENTION

Automotive radar solutions for advanced driver assistance systems (ADAS) are currently being deployed on a large scale. These solutions can typically be grouped into long range radar (LRR) applications and short range radar (SRR) applications. Both of these applications generally use frequency modulated continuous wave (FMCW) modulation techniques in order to be able to identify a radar target, such as a car or a pedestrian. In such radar systems, multiple receivers and receiver channels (e.g. 2-16) are connected to an antenna array or antenna patch with separate antenna elements so that any phase difference between signals on the receiver channels provides an indication of angle information of the radar target.

These radar systems typically use millimeter wave (MMW) frequencies for transmission and reception. The frequency synthesisers, comprising voltage controlled oscillators (VCOs) that are responsible for the generation of the millimeter wave frequencies, are important to the operation of the radar systems. Generally, voltage controlled oscillators operating at millimeter wave frequencies need to present a low phase noise, whilst providing a wide tuning range in order to cover the required modulation band (e.g. 1 GHz for LRR and 4 GHz for SRR).

Direct digital synthesis (DDS) is a very useful technique that has gained favour in the generation of radio frequency signals for use in a variety of applications from radio receivers to signals generators and particularly in the automotive radar field. DDS generates the waveform directly using digital techniques, rather than the traditional way adopted by indirect synthesizers that use a phase locked loop as the basis of their operation. The use of DDS has become more widespread in recent years with the advances being made in integrated circuit technology, which allows much faster speeds to be handled that, in turn, enable higher frequency DDS chips to be made. DDS is often used in conjunction with indirect or phase locked loop (PLL) synthesizer loops. By combining both technologies it is possible to take advantage of the best aspects of each.

Some DDS operate by storing the points of a waveform in digital format, and then recalling them to generate the waveform. Other DDS generate a sine wave without storing the points. The rate at which the synthesizer completes one waveform then governs the frequency, for example advancing the waveform can be viewed as a phase signal progresses around a circle. The synthesizer operates by storing various points in the waveform in digital form and then recalling them to generate the waveform.

Referring to FIG. 1, U.S. Pat. No. 6,569,607 describes a known radar system 100 whereby a built-in system test circuit 150 is included to calibrate a receiver to determine a phase difference between the transmit signals 140, 142. The built-in system test circuit 150 includes a digital (10) up-mixer 152 with externally-generated analog intermediate frequency (IF) signals 102, 104 routed to the digital (10) up-mixer 152. Furthermore, built-in system test circuit 150 includes a 77 GHz local oscillator input signal 120 that is amplified by amplifier(s) 127 and input to the IQ up-mixer 152. The up-converted high frequency signals output from the IQ up-mixer 152, which are in effect multiplied representations of the externally-generated analog intermediate frequency (IF) signals 102, 104 with the 77 GHz local oscillator input signal 120, are coupled into the respective transmitter paths via radio frequency couplers 110, 112. In this manner, the externally generated analog intermediate frequency (IF) signals 102, 104, multiplied by the 77 GHz local oscillator signal 120 form test-transmitter signals that aim to represent transmitter signals being received at receiver input ports 106, 108. The test-transmitter signals are then routed through respective baluns 114, 116 and input to respective digital (10) down-mixers 126, 128, where the test-transmitter signals are multiplied with a 77 GHz local oscillator signal 120 that is amplified by amplifier(s) 122, 124 respectively. The respective low frequency (e.g. IF) outputs from the respective digital (10) down-mixers 126, 128 are input to low frequency processing circuits 130, 132 that process the signals to determine the phase difference between the transmit paths 140, 142, and calibrate each receiver path accordingly.

As is apparent, the technique described in U.S. Pat. No. 6,569,607 requires additional radio frequency (RF) circuitry, as well as notably provided from an external test generation source that impacts on die area and power consumption. Furthermore, U.S. Pat. No. 6,569,607 requires more complexity and provides less flexibility, in particular due to a need for externally-generated digital (10) IF signals 102, 104 to be used and input to the built-in system test circuit 150.

In the radar field, in order to be ISO26262 compliant, there has been a recent requirement to detect errors and problems, such as a transmitter phase imbalance, on-chip.

SUMMARY OF THE INVENTION

The present invention provides an integrated circuit, a radar device and a method to calibrate at least one receiver as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Ele

FIG. 5 illustrates a flow chart of the operation of the calibration apparatus.

DETAILED DESCRIPTION

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Examples herein describe the embedding of a vector modulation generation circuit or component, such as one or more phase shifters, that is controlled by an embedded Direct Digital (frequency) Synthesis (DDS), in the transmit path of a radar device. In this manner, a mechanism is described to internally generate one or more test transmitter signals to loop back to at least one receiver for receiver calibration purposes.

Although examples of the invention are described with reference to a radar device, it is envisaged that the concepts herein described are applicable to any wireless device that employs a DDS and a vector modulation generation circuit or component. In some examples, the DDS controls a phase shifter in the transmitter path that generates a modulation signal that is used to calibrate one or more receiver paths and/or channels. In this manner, following calibration of the one or more receiver paths and/or channels, a processor or controller is able to accurately determine, for example, any phase differences between two or more transmit signals, phase difference, gain difference, RX gain vs frequency, RX filter measurement, etc., and potentially store this information for future access and use.

In some examples, the receiver calibration may include radio frequency portions and intermediate/low frequency portions of the receiver paths. In some examples, the embedded DDS may be configured to generate a high frequency modulated signal that can be used for receiver calibration of a radar integrated circuit/chip without a need for external components or externally-generated signals. Therefore, in some examples, in order to comply with ISO26262, it is possible to perform receive channel monitoring, such as measuring a gain of signals in each receive channel, on die (sometimes referred to as on the chip) and without using any external or costly RF test module.

Although examples of the invention are described with reference to re-use of a DDS, it is envisaged that the concepts herein described are applicable to a modulation signal being generated by any other circuit or component such as a sine wave generator. Although examples of the invention are described with reference to re-use of a phase shifter, it is envisaged that the concepts herein described are applicable to use of any multiplier or any RF mixer.

Figure 1:
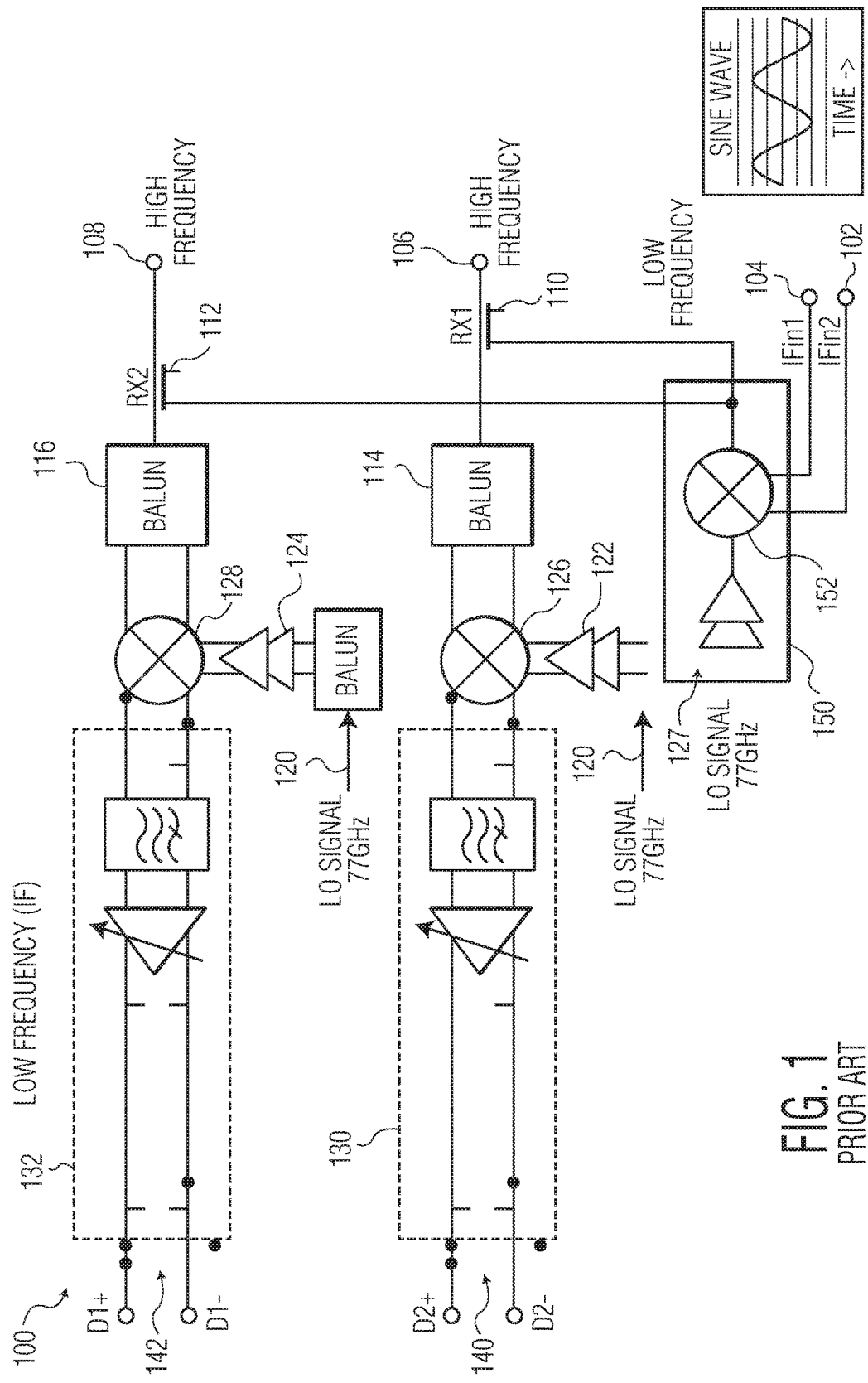
- FIG. 1 illustrates a known radar device having externally-generated intermediate frequency input ports to provide test-transmitter signals to a built-in system test unit.
Figure 2:
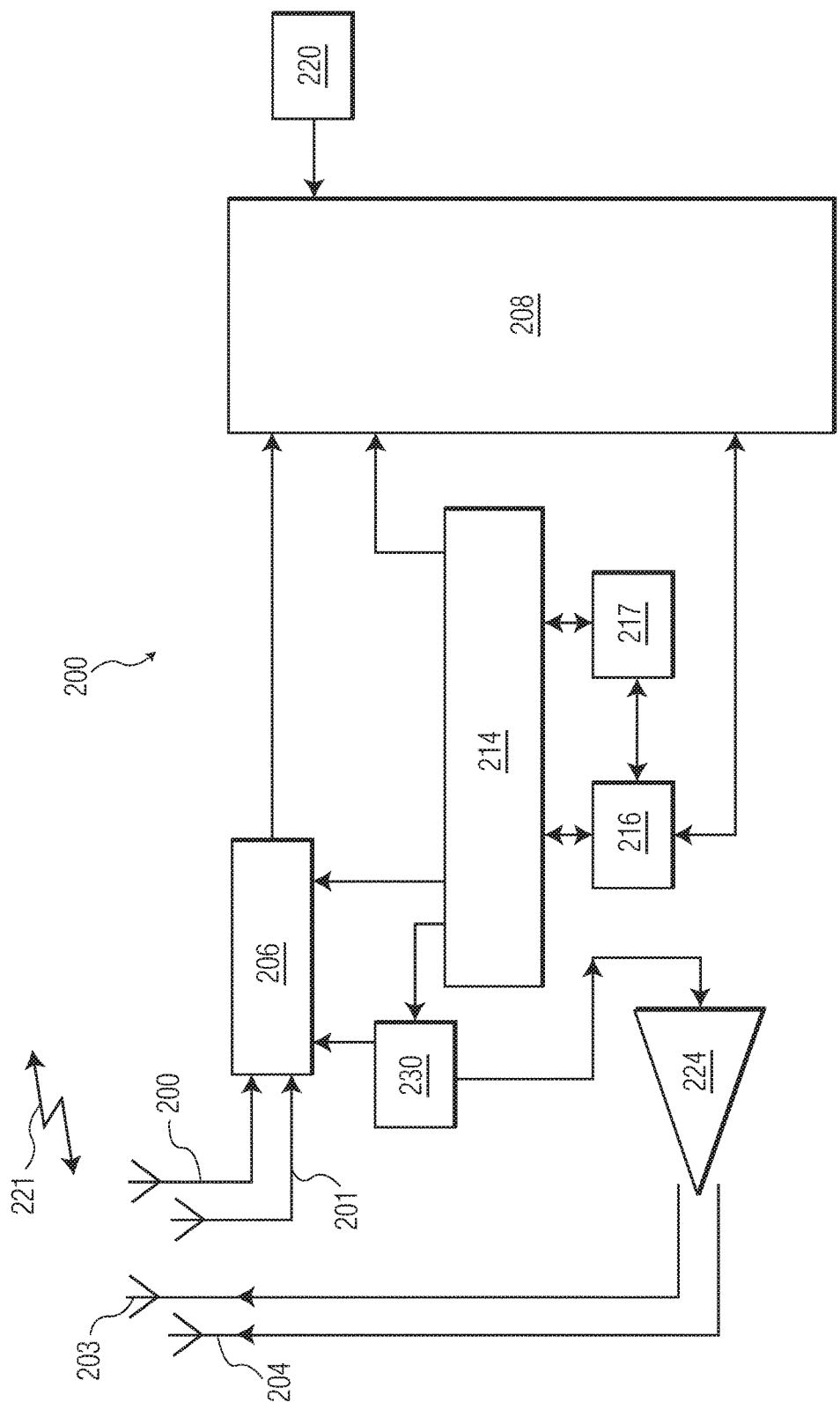
FIG. 2 illustrates an example block diagram of a radar device.

Referring to FIG. 2, a block diagram of an example of a radar device 200 operating at millimeter wave frequencies is illustrated. The radar device 200 comprises one or several antennas 202 for receiving transmissions 221, and one or several antennas 203 for the transmitter, with one shown for each for simplicity reasons only. In this example, the number of antennas 202, 203 used depends on the number of radar receiver and transmitter channels implemented in a given radar device. One or more receiver chains, as known in the art, includes receiver front-end circuitry 206, effectively providing reception, frequency conversion, filtering and intermediate or base-band amplification, and finally analog to digital conversion. In some examples, such circuits or components may reside in signal processing module 208, dependent upon the specific selected architecture. Thus, the receiver front-end circuitry 206 is coupled to the signal processing module 208 (generally realized by a digital signal processor (DSP)). A skilled artisan will appreciate that the level of integration of receiver circuits or components may be, in some instances, implementation-dependent and the illustrated radar device is one of many architectures that can be employed.

A controller 214 maintains overall operational control of the radar device 200, and in some examples may comprise time-based digital functions (not shown) to control the timing of operations (e.g. transmission or reception of time-dependent signals, frequency-modulated continuous wave (FMCW) modulation generation, control of a DDS module, etc.) within the radar device 200. The controller 214 is also coupled to the receiver front-end circuitry 206 and the signal processing module 208. In some examples, the controller 214 is also coupled to a buffer module 217 and a memory device 216 that selectively stores operating regimes, such as decoding/encoding functions, phase-to-phase difference values for the respective transmitter and receiver paths, transmitter and receiver gain information, and the like.

In this manner, following calibration of the one or more receiver paths and/or channels, the signal processing module 208 or controller 214 is able to accurately determine, for example, any phase differences between two or more transmit signals, and store this information for future access and use.

As regards the transmit chain, this essentially comprises a power amplifier (PA) 224 coupled to the transmitter antenna 203, antenna array, or plurality of antennas. The transmitter comprises the PA 224 and frequency generation circuit 230 that are both operationally responsive to the controller 214.

A single processor may be used to implement a processing of receive signals, as shown in FIG. 2. Clearly, the various components within the radar device 200 can be realized in discrete or integrated component form, with an ultimate structure therefore being an application-specific or design selection.

In radar device 200, radar transceiver topology is different from other traditional wireless communication architectures (e.g. Bluetooth™, WiFi™, etc.), as modulation occurs within a phase locked loop (PLL) (typically via the fractional-N divider), or via a direct digital synthesizer (DDS), and is applied directly to the transmitter chain comprising a power amplifier (PA) 224. Therefore, in some examples, the receiver front-end circuitry 206 and transmitter chain are operably coupled to a frequency generation circuit 230 that comprises a voltage controlled oscillator (VCO) circuit and/or PLL and/or fractional-N divider (not shown) and/or DDS configured to provide local oscillator signals to down-convert modulated signals to a final intermediate or base-band frequency or digital signal.

Figure 3:
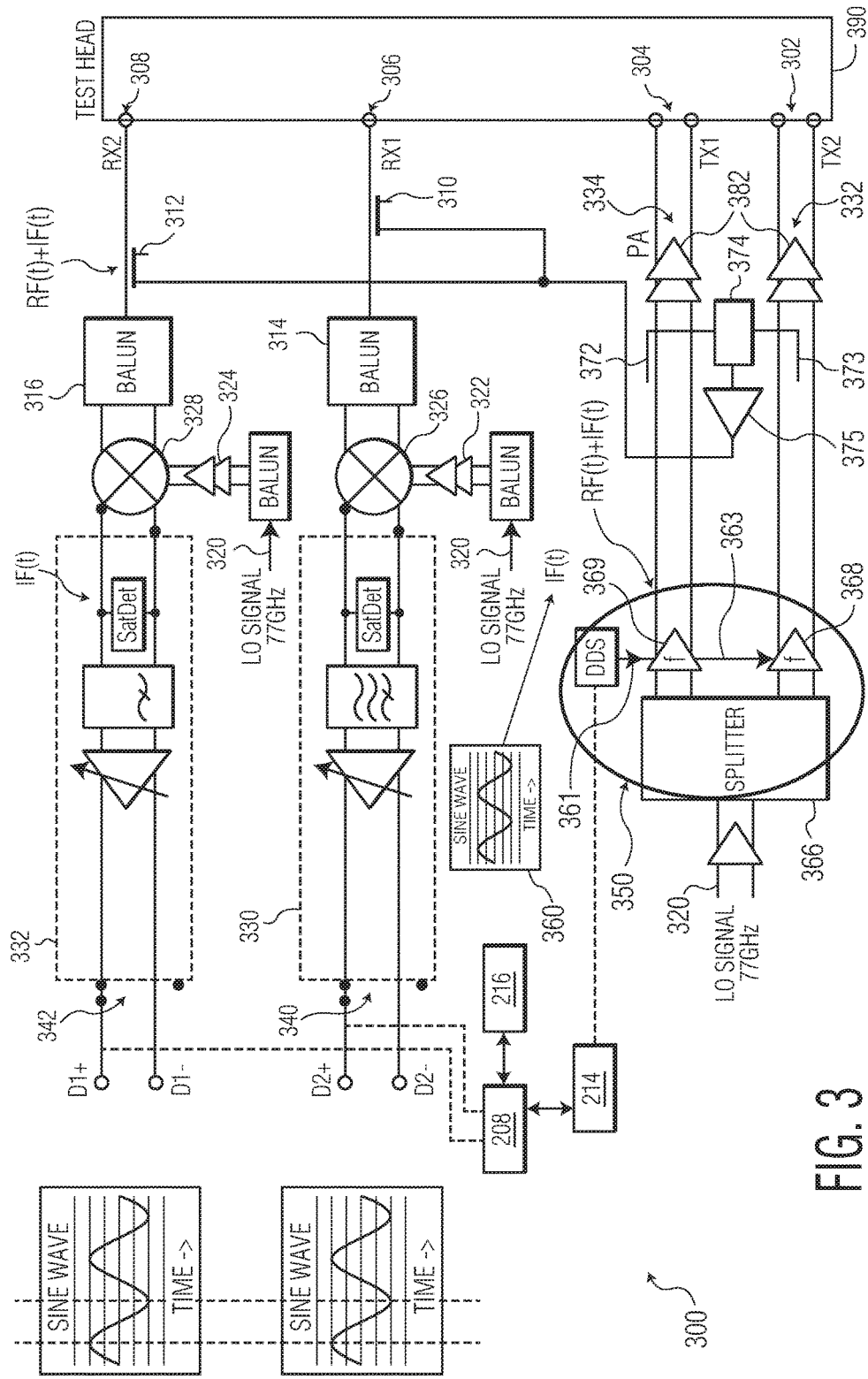
FIG. 3 illustrates an example radar device employing DDS and configured to generate test-transmitter signals for receiver calibration.

FIG. 3 illustrates an example of a radar device 300 employing DDS and configured to generate, on chip, one or more test-transmitter signals to be routed to a receiver chain within the radar device 300. The example radar device 300 comprises, in a transmitter path, a local oscillator signal 320 applied to a transmitter signal generation circuit 350. The transmitter signal generation circuit 350 comprises a splitter 366 configured to split the LO signal into two transmit signals 332, 334 (e.g. cos RFt and sin RFt) to be output to respective transmitter antenna elements via transmit output nodes 302, 304. In some examples, the split, LO signals can be independently phase adjusted by respective phase shifters 368, 369.

Within the transmitter signal generation circuit 350, a direct digital synthesis (DDS) 360 controls the phase shifting independently imparted on the split LO signals by the respective phase shifters 368, 369. In this first transmit mode of operation, the control of the phase shifters 368, 369 by the DDS 360 is at DC.

Once the LO signals have been independently phase adjusted by respective phase shifters 368, 369, the signals are passed through respective power amplifier chains 382 before being routed to transmit output nodes 302, 304. In this manner, by using transmit signals generated by direct digital synthesis and independent phase adjustment, two transmit signals at the same frequency but with slightly different phases may be radiated from respective transmitter antenna elements, thereby allowing a better directivity of the radiated beam from radar device 300.

In some examples, the DDS 360 performs two levels of control. In a first transmit mode of operation, the DDS 360 may check the functionality of the integrated circuit/chip over time. For example the DDS 360 may check, say, that the phase-to-phase difference doesn't exceed a level-defined as parameter in a memory 216, or the receiver gain will not be below a minimum gain defined in the memory 216. If the comparison performed by the DDS 360 indicates a receiver gain that is below a minimum gain defined in the memory 216, the DDS 360 may then interrupt the controller 214 to say that the integrated circuit/chip is not functioning correctly or optimally. In accordance with a second mode of operation, the DDS may be used as part of a receiver calibration. In the example receiver calibration process, the gain may be measured, and if the gain is below a target gain then the gain in the receiver chain (e.g. one or more of the receiver amplifiers) is adjusted to meet this gain.

In the second mode of operation, the DDS 360 may be configured to apply a first control signal (ctrl1) to a first phase shifter, say phase shifter 369, where ctrl1=cos(phi), where phi is a constant. The DDS 360 may be configured to also apply a second control signal (ctrl2) to a second phase shifter, say phase shifter 368, where ctrl2=sin(phi). In this manner, the RF transmit signal, namely split LO signal 320 is rotated by an angle phi at 77 GHz.

Thus, in some examples in a second mode of operation, radar device 300 is also re-configurable to perform a self-test receiver calibration in response to two or more self-generated transmit signals that are configured to loop back into the one or more receiver paths. In some examples, the control of the operational mode of the radar device may be set by controller 214, with calibration information read and processed by signal processing module 208 and stored in memory 216. In some examples, a receiver calibration or test routine may be performed as a simple 'good'/'no good' receiver test without processed test information being stored for later reading. In this example, receiver parameters may be dynamically and substantially immediately adjusted according to the calibrated data.

In the second calibration mode of operation, the DDS 360 may be configured to apply a low frequency modulated control signal (ctrl1 mod) to a first phase shifter, say phase shifter 369, where ctrl1 mod=cos(phi)t. The DDS 360 may be configured to also apply a second control signal (ctrl2 mod) to a second phase shifter, say phase shifter 368, where ctrl2 mod=sin(phi)t. In this manner, the RF transmit signal, namely split LO signal 320 divided into a RF signal, may be modulated with an imparted low frequency (e.g. at say 1 MHz) on the LO signal, which in one example is at 77 GHz. The imparting of the low frequency on the LO signal by the control signals under control of the DDS 360 enables a receiver calibration to be performed on chip. By applying a low frequency, e.g. 1 MHz, modulated signal to the LO signal, the receivers can easily demodulate the generated high frequency test-transmitter signals to reproduce a low frequency sine wave that is easy to process and supports on chip testing and/or receiver calibration.

A multiplier function realized in the phase shifters may also generate a cos(RF(t)+IF(t)) function. In this example, RF(t) is a very high frequency where the radar is running at, say, 77 GHz and IF(t) is a low frequency coming from the DDS. This modulation shifts the RF frequency by a small IF frequency, which thereby allows the receiver(s) to receive and process an IF frequency after down-conversion. If there was no modulation of this carrier, i.e. as in the normal first transmit mode of operation, the loopback to the receiver will demodulate only DC.

Thus, in some examples, in the second calibration mode of operation, the phase shifters 368, 369, under control of the DDS 360, are re-used for a different function and configured to independently phase adjust LO signals. In the second calibration mode of operation, the independently phase adjusted LO signals are routed to the receiver paths in order to represent received transmit signals for calibration purposes.

Thus, in some examples, the phase shifters 368, 369 may be configured to apply vector modulation to the LO signals, thereby providing a phase adjusted output signal performing the operation of:

$$\cos RF^*ctrl1\ mod + \sin RF^*ctrl2\ mod \qquad [1]$$

where RF is the LO input signal to the phase shifters.

In some examples in the second calibration mode of operation, DDS 360 controls the phase imparted by phase shifters 368, 369 by making ctrl1 mod=sin IFt and ctrl2 mod=cos IFt, thereby producing from [1]:

$$\cos RF^*ctrl1\ mod + \sin RF^*ctrl2\ mod = \sin(RFt+Ift) \qquad [2]$$

due to the trigonometric formula: sin (A+B)=sinAcosB+cos A sin B.

In some examples, DDS 360 controls the phase imparted by phase shifters 368, 369 in steps of 11°, for example through control of analog control signals (ctrl1 mod and ctrl2 mod). In some examples, the imparting of the low/IF frequency on the LO signal using the phase shifters 368, 369 is achieved using a DC/AC switchable control signal 361 from DDS 360.

In this manner, the DDS 360 (or in other examples any other suitable controller component or circuit) may be able to switch the operational mode of the radar device 300.

In some examples, controller 214 re-configures the operation of the DDS 360 to support both modes, which in turn effectively forces the DDS 360 to output either of the two types of control signals to the phase shifters 368, 369 in order to transition between the first transmit mode of operation and the second calibration mode of operation. Thus, in some examples, only the control signal provided by the DDS 360 is changed.

In the second calibration mode of operation, a first low frequency modulated LO signal and second low frequency modulated LO signal, for example the signals output from phase shifter 368, 369, are coupled from transmitter path via couplers 372, 373. These low frequency modulated LO signals are individually routed or combined through multiplexer 374 and in some instances gain controlled in attenuator 375 in order to adjust the signal levels suitable to be coupled into respective first and second receiver paths via first and second couplers 310, 312. In this example, one or both of the first and second receiver paths are then able to process a portion of the low frequency modulated RF signal that was internally-generated in the radar device 300.

Examples of the invention therefore have no need to generate RF test signals from the test head 390, since the loopback allows the ability to provide the needed signal to the receiver input. In some examples, the isolation between the transmit path(s) and the receiver path(s) may be increased by, say, using a switching network (not shown), to reduce the leakage of transmit signal direct into the receiver paths via the loopback path during the first normal mode of operation.

In this manner, the generated low frequency modulated LO signals represent transmitter signals that have undergone independent phase shifting whilst being propagated from the transmitter and subsequently returned to receiver input ports 306, 308. The low frequency modulated LO signals are then routed through respective baluns 314, 316 and input to respective digital (1Q) down-mixers 326, 328, where the low frequency modulated LO signals are multiplied (i.e. down-converted) with a 77 GHz local oscillator signal 320 that is amplified by amplifier(s) 322, 324 respectively. The respective resultant low frequency (e.g. IF) outputs from the respective digital (1Q) down-mixers 326, 328 are input to low frequency processing circuits 330, 332 that process the signals to determine the phase difference between the transmit paths 340, 342.

In some examples, a signal processing module 208 processes the receive signals following down-conversion, filtering and amplification. The signal processing module 208 is also coupled to memory device 216 that may selectively store the calibration results, and the like. In this manner, following calibration of the one or more receiver paths and/or channels, the signal processing module 208 or controller 214 is able to accurately determine any phase and/or gain difference between two or more transmit signals, and store this information for future access and use.

Figure 4:
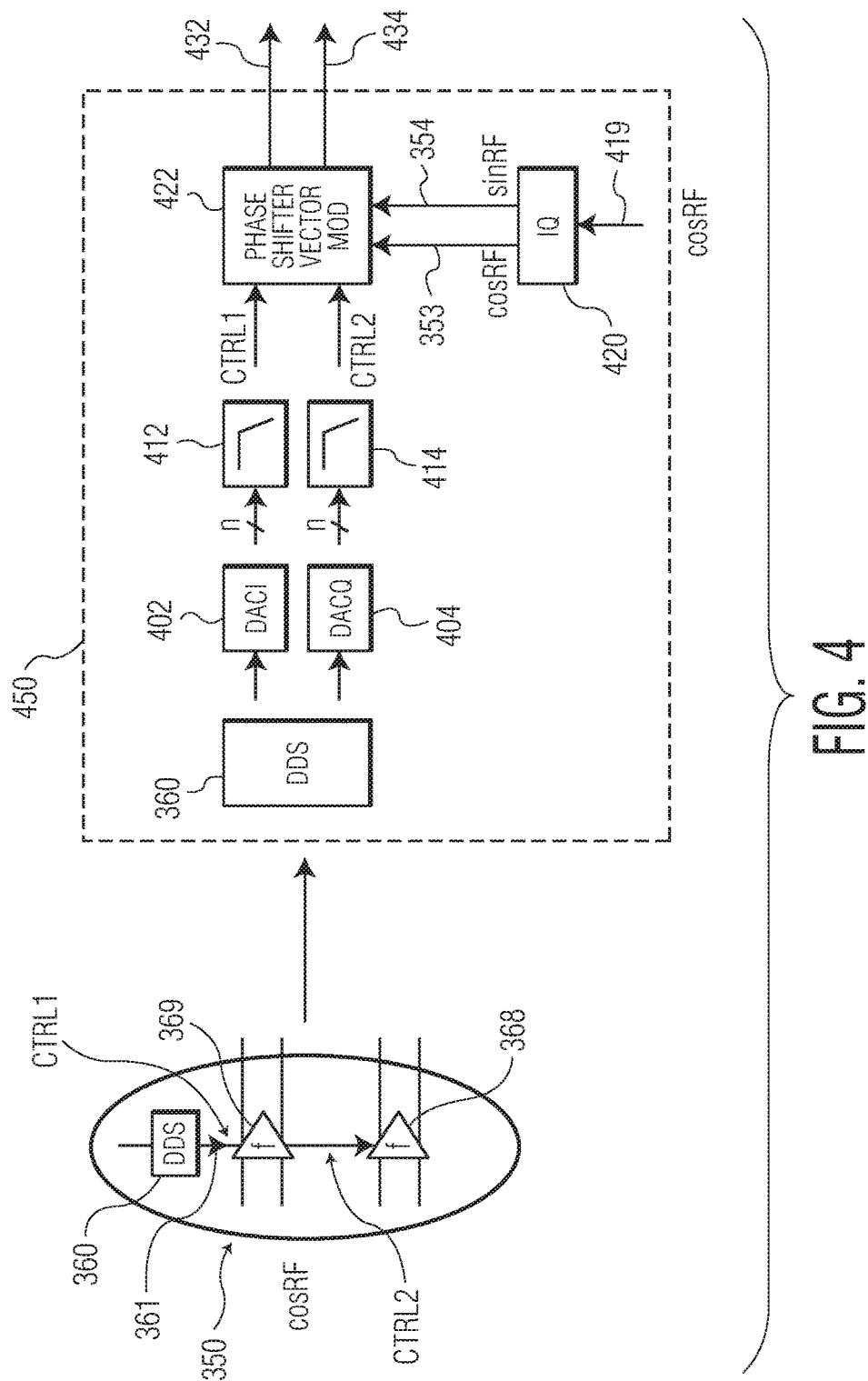
FIG. 4 illustrates an example of a phase shifter and DDS arrangement that has been configured to generate test-transmitter signals for receiver calibration.

Referring to FIG. 4, a further example of a phase shifter and DDS arrangement is illustrated, which in some examples may be located in an integrated circuit 450. The integrated circuit 450 comprising phase shifter 422 and DDS 360 is reconfigurable to generate at least two test-transmitter signals. In this example, in a second calibration mode of operation, the DDS 360 determines a desired low frequency waveform (IFt) to be applied onto the RF (e.g. LO) signal and converts this into a digital representation of the waveform. Typically, this may be accomplished using a waveform map, which is a memory (not shown) that stores a number that corresponds to a voltage required for each value of phase on the waveform and which contains a vast number of points on the waveform, very many more than are accessed each cycle.

In one example of the direct digital synthesizer 360 in the second calibration mode of operation, a sine look up table (not shown) may be used to generate a required sine wave, such as sin IFt, and/or a cos look up table (not shown) may be used to generate a required cos wave, such as cos IFt. Thus, in this manner, the two signals generated by the DDS 360 have a phase difference of 90°. A very large number of points is required, so that the phase accumulator can increment by a certain number of points to set the required frequency. The next stage is to convert the digital numbers coming from the sine look up table and cos look up table into an analogue voltage, for example using first and second quadrature ('I' and 'Q') digital to analog converters (DACs) 402, 404.

In the calibration mode of operation, the analog form of the cos IFt and sin IFt control signals are input to low pass filters 412, 414 in order to remove any aliasing effects from the DACs 402, 404, and optionally amplify the signals to the required level, as and when necessary.

The outputs from low pass filters are input as control signals to, in this example, a single phase shifter circuit 422 configured to receive cos RF (local oscillator) signal 353 and sin RF (local oscillator) signal 354 as described in FIG. 3, and generate one or both vector modulated output(s) 432, 434. In this example, cos RF signal 353 and sin RF signal 354 are generated by an IQ generator 420 from an input Cos RF (local oscillator) signal 419. In this example, a single phase shifter circuit is shown to effect the same function as phase shifters 368, 369, of FIG. 3, under control of the DDS 360. In this example, the DDS 360 is still capable of independently imparting a constant phase or a low frequency signal to the phase shifter(s) 422 to generate phase-adjusted or low frequency modulated LO signals. The DDS 360 is then able to route the independently low frequency modulated LO signals to one or both of the receiver paths in order to represent received transmit signals for receiver calibration purposes.

In some example, the phase shifter 422 may be implemented as an I/Q mixer that is able to realize vector modulation. In other examples, any other component or circuit that is capable of realizing vector modulation may be used.

Tuning may be accomplished by DDS 360 by increasing or decreasing a size of a step or phase increment between different sample points. A larger increment at each update to a phase accumulator will mean that the phase reaches the full cycle value faster and the frequency is correspondingly high. Smaller increments to the phase accumulator value means that it takes longer to increase the full cycle value and a correspondingly low value of frequency results. In this way it is possible for the DDS 360 to control the transmit output frequency by simply changing the increment value.

Thus, in some examples, the phase shifters 368, 369 or single phase shifter 422 apply/applies vector modulation to the LO signals, thereby providing a phase adjusted output signal.

Referring to FIG. 5, a flowchart 500 illustrates an example method of calibrating at least one receiver of a radar device, for example by determining a phase and/or gain difference between transmitter paths or any other suitable calibration parameter. In one example, the radar device comprises a re-configurable DDS and phase shifter arrangement that is able to switch between a first (e.g. normal) transmit mode of operation and a second receiver calibration mode of operation. The method of calibrating at least one receiver of a radar device comprises: switching the radar device to a receiver calibration mode of operation; re-configuring a transmitter circuit of the radar device to generate at least two modulated transmitter signals; routing the generated at least two modulated transmitter signals to the at least one receiver; processing the received at least two modulated transmitter signals; and calibrating the at least one receiver of the radar device using the processed at least two modulated transmitter signals.

Initially, at 502, the example flowchart starts and a controller switches the radar device to a (second) receiver calibration mode of operation at 504. At 506, the controller re-configures the DDS to switch to digital IF modulation output control signals, say of cos IFt and sin IFt at 1 MHz. At 508, the example flowchart converts the digital IF modulation output control signals of cos IFt and sin IFt into analog form. At 510, the analog IF modulation output control signals of cos IFt and sin IFt may be filtered. At 512, independent analog IF modulation output control signals may be multiplied with input LO signals of sin RF and cos RF. At 514, the independently low frequency modulated signals are coupled to one or more respective receiver paths in a calibration mode of operation. At 516, the receiver path(s) down-convert(s), filter(s) and amplify(-ies) the test transmitter signals, which are then routed to a signal processor module to determine a phase difference between the transmit signals routed through the receiver path(s). In one example, only one receiver may be used, for example to perform receiver gain measurement, whereas, for example two or more receivers may be needed to measure a gain difference between channels. At 518, the calibration information processed by the signal processor module may be stored in a memory. At 520, the example flowchart ends.

Although some examples have been implemented for millimeter wave radar devices, this should not be seen as limiting. It is envisaged that some examples may be applied to applications in the frequency range of; 76-80 GHz—Radar, 60 GHz—WiFi™, 94 GHz—imaging, 20 Gbps/40 Gbps—clock and data recovery, for example.

In some examples, by incorporating an embedded DDS and vector modulation circuit, e.g. in a form of one or more phase shifters, in at least a two-mode of operation, ISO26262 compliance may be achieved. In some examples, a cost reduction may be achieved due at least to there being no requirement for additional test pins/nodes or a requirement to provide an external I/Q test signal via a test head. In some examples, a die area saving may also be achieved.

In the foregoing specification, some examples have been described with reference to specific example embodiments. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Examples may be employed in an integrated circuit comprising a DDS or other sine wave generation component or circuit. Alternatively, the examples may be implemented as any number of separate integrated circuits or separate devices interconnected with each other in a suitable manner, for example, where the transmitter circuitry and receiver circuitry may be employed on different integrated circuits.

Also, the invention is not limited to physical devices or units implemented in non-programmable hardware but can also be applied in programmable devices or units with wireless capability and able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit for a radar device comprising at least one transmitter and at least one receiver, the integrated circuit comprising:
   a direct digital synthesiser, DDS, configured to output at least one control signal; and
   a multiplier configured to receive a local oscillator input signal and a further input signal from the DDS;
   wherein:
   in a first mode of operation the DDS and multiplier cooperate to generate at least one transmitter signal to be transmitted from the radar device; and
   in a second mode of operation the DDS and multiplier cooperate to generate at least one low frequency modulated transmitter signal to be internally routed to the at least one receiver for calibrating the at least one receiver.

2. The integrated circuit of claim 1 wherein the DDS is configured to output a DC control signal in the first mode of operation and re-configured to output a low frequency control signal in the second mode of operation.

3. The integrated circuit of claim 2 wherein in the second mode of operation the at least one DDS control signal comprises two low frequency signals separated by 90 degrees.

4. The integrated circuit of claim 1 wherein the multiplier is at least one from a group of: a phase shifter, a radio frequency, RF, mixer, a RF quadrature mixer.

5. The integrated circuit of claim 1 wherein the multiplier is configured to realize vector modulation in the second mode of operation.

6. The integrated circuit of claim 1 wherein the multiplier cooperating with the DDS is configured to realize phase generation and low frequency generation in at least two modulated transmitter signals.

7. The integrated circuit of claim 1 wherein the local oscillator input signal comprises two radio frequency signals separated by 90 degrees.

8. A radar device comprising:
   at least one receiver to be calibrated; and
   at least one transmitter comprising:
   a direct digital synthesiser, DDS, configured to output at least one control signal; and
   a multiplier configured to receive a local oscillator input signal and a further input signal from the DDS;
   wherein:
   in a first mode of operation the DDS and multiplier cooperate to generate at least one transmitter signal to be transmitted from the radar device; and
   in a second mode of operation the DDS and multiplier cooperate to generate at least one low frequency modulated transmitter signal to be internally routed to the at least one receiver for calibrating the at least one receiver.

9. The radar device of claim 8 wherein the DDS is configured to output a DC control signal in the first mode of operation and re-configured to output a low frequency control signal in the second mode of operation.

10. The radar device of claim 9 further comprising a signal processor configured to process the received at least two modulated transmitter signals; and calibrate the at least one receiver of the radar device using the processed at least at least one low frequency modulated transmitter signal.

11. The radar device of claim 10 further comprising a memory operably coupled to the signal processor and configured to store calibration information related to the at least one receiver of the radar.

12. The radar device of claim 8 further comprising a controller operably coupled to the DDS and adapted to re-configure the DDS to output at least one low frequency control signal in the second mode of operation.

13. The radar device of claim 8 wherein the radar device is from a group of: a long range radar device, short range radar device, operating at millimeter waveform frequencies.

14. A method of calibrating at least one receiver of a radar device, the method comprising:
   switching the radar device to a receiver calibration mode of operation;
   re-configuring a transmitter circuit of the radar device to generate at least one low frequency modulated transmitter signal;
   routing the generated at least one low frequency modulated transmitter signal to the at least one receiver internally within the radar device;
   processing the received at least one low frequency modulated transmitter signal; and
   calibrating the at least one receiver of the radar device using the processed at least one low frequency modulated transmitter signal.

15. The method of claim 14 wherein re-configuring a transmitter circuit of the radar device to generate at least one low frequency modulated transmitter signal comprises re-configuring a direct digital synthesiser to generate at least one digital intermediate frequency modulation signal.

16. The method of claim 15 wherein re-configuring the direct digital synthesiser to generate at least one digital intermediate frequency modulation signal comprises generating two digital intermediate frequency signals separated by 90 degrees.

17. The method of claim 14 wherein calibrating the at least one receiver comprises determining a phase difference between the at least two modulated transmitter signals routed through the at least one receiver path(s).

18. The method of claim 14 wherein the at least one low frequency modulated transmitter signal comprises at least two independently low frequency modulated signals.

19. The method of claim 14 wherein re-configuring a transmitter circuit of the radar device to generate at least one low frequency modulated transmitter signal comprises applying independent low frequency modulated control signals to two input local oscillator signals separated by 90 degrees.

* * * * *

UNITED STATES PATENT AND TRADEMARK OFFICE
CERTIFICATE OF CORRECTION

PATENT NO.         : 9,835,715 B2
APPLICATION NO.    : 14/660471
DATED              : December 5, 2017
INVENTOR(S)        : Dominique Delbecq et al.

Page 1 of 1

It is certified that error appears in the above-identified patent and that said Letters Patent is hereby corrected as shown below:

On the Title Page

Prior to item (51) Int. Cl., the following should be added:
(30) Foreign Application Priority Data
Oct. 17, 2014 (WO) ..............PCT/IB2014/002474

Signed and Sealed this
Twenty-eighth Day of May, 2019

Andrei Iancu
*Director of the United States Patent and Trademark Office*